United States Patent
Murakami et al.

(10) Patent No.: US 9,207,308 B2
(45) Date of Patent: Dec. 8, 2015

(54) DOPPLER SENSOR AND ILLUMINATION DEVICE INCLUDING SAME

(75) Inventors: Tadashi Murakami, Hirakata (JP); Shigeo Gotou, Yao (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 792 days.

(21) Appl. No.: 13/371,730

(22) Filed: Feb. 13, 2012

(65) Prior Publication Data

US 2012/0206288 A1   Aug. 16, 2012

(30) Foreign Application Priority Data

Feb. 15, 2011   (JP) .................. 2011-030026

(51) Int. Cl.
| | |
|---|---|
| G01S 13/00 | (2006.01) |
| G01S 7/41 | (2006.01) |
| G01S 13/56 | (2006.01) |
| H05B 37/02 | (2006.01) |
| H04B 1/59 | (2006.01) |
| G01S 13/75 | (2006.01) |

(52) U.S. Cl.
CPC .............. G01S 7/415 (2013.01); G01S 13/56 (2013.01); H05B 37/0227 (2013.01); *G01S 13/75* (2013.01); *H04B 1/59* (2013.01); *Y02B 20/44* (2013.01)

(58) Field of Classification Search
CPC ......... G01S 13/04; G01S 13/56; G01S 7/415; H05B 37/0227; Y02B 20/44
USPC .......................................................... 342/27
See application file for complete search history.

(56) References Cited

U.S. PATENT DOCUMENTS

| | | | | |
|---|---|---|---|---|
| 3,760,400 A | * | 9/1973 | Galvin et al. ................. | 340/554 |
| 4,008,474 A | * | 2/1977 | Rittenbach ..................... | 342/114 |
| 4,400,700 A | * | 8/1983 | Rittenbach ..................... | 342/100 |
| 5,150,099 A | * | 9/1992 | Lienau .......................... | 340/552 |
| 5,323,162 A | * | 6/1994 | Fujisaka et al. ............. | 342/25 B |
| 5,760,687 A | * | 6/1998 | Cousy ........................... | 340/554 |
| 5,790,032 A | * | 8/1998 | Schmidt ...................... | 340/573.4 |

(Continued)

FOREIGN PATENT DOCUMENTS

| | | |
|---|---|---|
| JP | 2008-224528 A | 9/2008 |
| JP | 2010-176911 A | 8/2010 |
| JP | 2010191857 | 9/2010 |

OTHER PUBLICATIONS

European Search Report dated Oct. 5, 2012.

(Continued)

*Primary Examiner* — Frank J McGue
(74) *Attorney, Agent, or Firm* — Bacon & Thomas, PLLC

(57) ABSTRACT

A doppler sensor includes a doppler signal generation unit and a determining unit. The doppler signal generation unit serves to transmit an electric wave to a detection range and receiving electric waves from a detection range, and generating a doppler signal based on a transmission signal used in transmitting the electric wave and a reception signal obtained from the received electric waves, and the determining unit serves to determine whether or not there exists a human body in the detection range through a spectrum analysis using a peak frequency, which is a frequency having the highest intensity in a difference spectrum obtained by subtracting a background spectrum from the spectrum of the doppler signal.

3 Claims, 3 Drawing Sheets

(56) References Cited

U.S. PATENT DOCUMENTS 6,307,475 B1 * 10/2001 Kelley ................... 340/573.1
2007/0040728 A1 * 2/2007 Nishimura et al. ............. 342/70
2011/0032139 A1 * 2/2011 Benitez et al. ................. 342/28

OTHER PUBLICATIONS

English translation of Chinese Office Action dated Aug. 9, 2013.

* cited by examiner

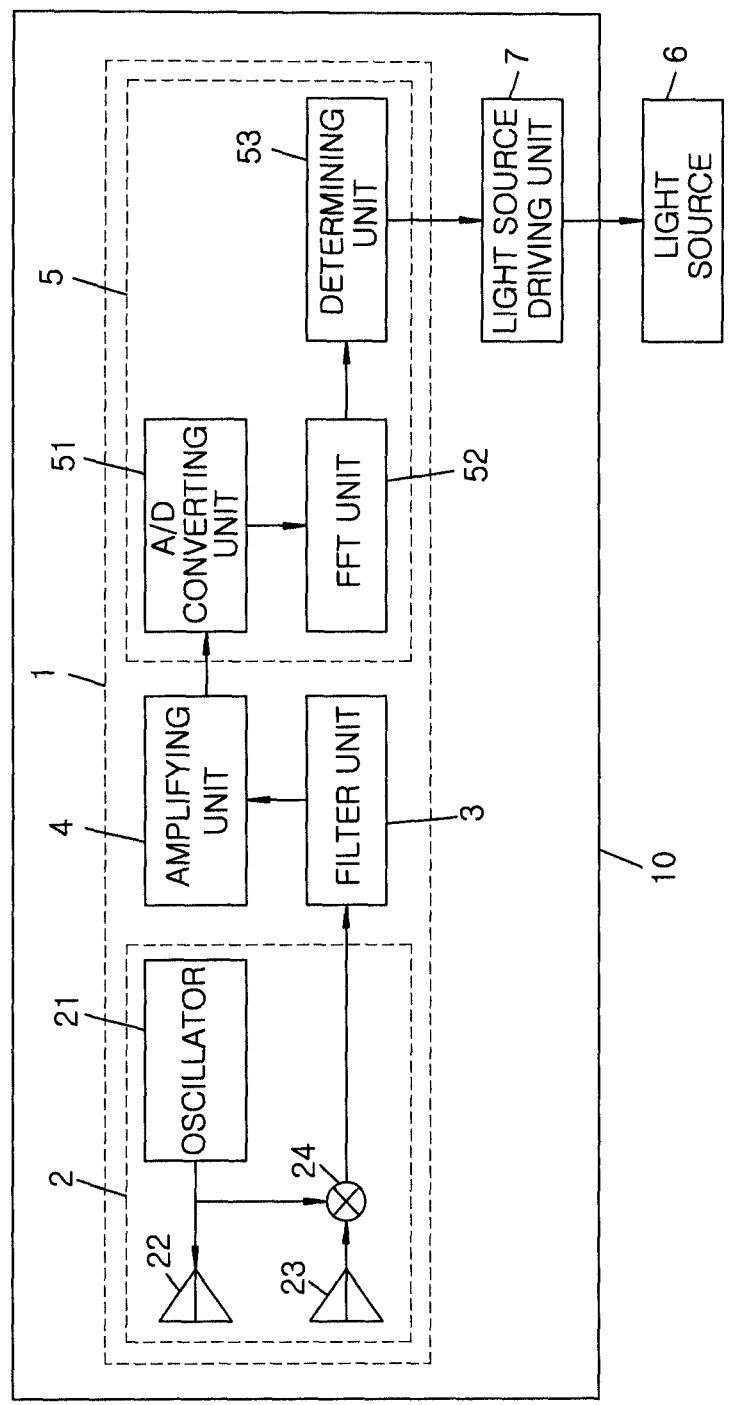

DOPPLER SENSOR AND ILLUMINATION DEVICE INCLUDING SAME

FIELD OF THE INVENTION

The present invention relates to a doppler sensor and an illumination device including same.

BACKGROUND OF THE INVENTION

A doppler sensor for detecting a human body has been provided in the prior art (see, e.g., Japanese Patent Application Publication No. 2010-191857. The doppler sensor is designed to transmit or radiate an electric wave (transmission wave), e.g., millimeter wave, to a detection range and receive electric waves (reflected waves) reflected from the detection range, thereby obtaining a doppler signal of a frequency band corresponding to a movement speed of a human body and determining whether or not a human body exists within the detection range depending on the doppler signal.

Another sensor for detecting a human body is, for example, a thermal sensor for detecting thermic rays radiated from a human body. However, in comparison to this thermal sensor, the doppler sensor has the advantage of detecting a human body located at a long distance. Accordingly, the doppler sensor is more adequate for the case of being fixed to a high ceiling in a building.

The doppler sensor as described above is used in an illumination device which turns on and off a light source depending on a detection of a human body by the doppler sensor. In comparison to the case when the light source is manually turned on and off, such an illumination device makes it possible to reduce unnecessary power consumption caused when a user forgets manipulation of turning off the light source.

In the prior art doppler sensor, the sum of intensities of a certain number of frequencies in a doppler signal is compared with a certain threshold value and, when the sum is higher than the threshold value, it is determined that a human body exists.

However, it happens that, even with moving objects, other than a human body, the sum can be higher than the threshold value, causing erroneous detection.

SUMMARY OF THE INVENTION

In view of the above, the present invention provides a doppler sensor capable of preventing erroneous detection and an illumination device including such a doppler sensor.

In accordance with an aspect of the present invention, there is provided a doppler sensor including a doppler signal generation unit for transmitting an electric wave to a detection range and receiving electric waves from a detection range, and generating a doppler signal based on a transmission signal used in transmitting the electric wave and a reception signal obtained from the received electric waves; and a determining unit for determining whether or not there exists a human body in the detection range through a spectrum analysis using a first peak frequency, which is a frequency having the highest intensity in a difference spectrum obtained by subtracting a background spectrum from the spectrum of the doppler signal.

In the spectrum analysis, the determining unit may calculate sums of intensities over frequency bands of a same width in a low frequency side and a high frequency side with respect to the first peak frequency, and determines that there is no human body in the detection range when a sum in the low frequency side is less than that in the high frequency side.

In the spectrum analysis, the determining unit may determine that there is no human body in the detection range when one of the first peak frequency and a second peak frequency having the second highest intensity in the difference spectrum is an integral multiple of the other.

In accordance with another aspect of the present invention, there is provided an illumination device including the doppler sensor; and a light source driving unit for turning on an electric light source based on a determination result from the determining unit.

In accordance with an embodiment of the present invention, it is determined whether a human body exists in a detection range through a spectrum analysis using a first peak frequency, which is a frequency having the highest intensity in the difference spectrum obtained by subtracting a background spectrum from the spectrum of the doppler signal. Accordingly, it is possible to suppress an erroneous detection in comparison to a case where the foregoing spectrum analysis is not executed.

BRIEF DESCRIPTION OF THE DRAWINGS

The objects and features of the present invention will become apparent from the following description of embodiments, given in conjunction with the accompanying drawings, in which:

FIGS. 1A to 1C show examples of difference spectrums obtained in an embodiment of the present invention, in which FIG. 1A shows an example of determining that a human body exists in a detection range, and FIGS. 1B and 1C show examples of determining that no human body exists in the detection range, respectively;

FIG. 2 is a block diagram showing an illumination device in accordance with the present embodiment.

DETAILED DESCRIPTION OF THE EMBODIMENTS

Figure 1A:
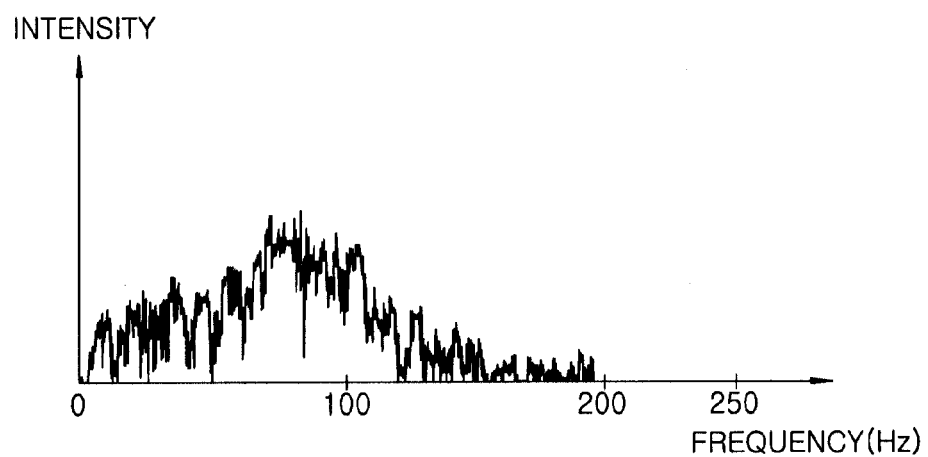

An embodiment of the present invention will be described with reference to the accompanying drawings which form a part hereof.

As shown in FIG. 2, an illumination device 10 of the present embodiment includes a doppler sensor 1 and a light source driving unit 7. The doppler sensor 1 includes a transceiver unit 2 for transmitting an electric wave and receiving electric waves to and from a certain detection range; a filter unit 3 for extracting a doppler signal from an output from the transceiver unit 2; an amplifying unit 4 for amplifying an output from the filter unit 3; an A/D converting unit 51 for performing A/D conversion on an output from the amplifying unit 4; a fast Fourier transform (FFT) unit 52 for performing FFT on an output from the A/D converting unit 51 to generate an intensity distribution of frequencies (spectrum) in the doppler signal; and a determining unit 53 for determining whether or not there exists a human body within the detection range based on an output from the FFT unit 52. That is, the transceiver unit and the filter unit 3 constitute a doppler signal generation unit.

The A/D converting unit 51, the FFT unit 52, and the determining unit 53 are integrated in a one-chip microcomputer 5. A spectrum is, e.g., periodically inputted to the determining unit 53 from the FFT unit 52.

The transceiver unit 2 includes an oscillator 21 which generates a transmission signal of a certain frequency; a transmitting antenna 22 for transmitting to a detection range a transmission wave, which is an electric wave to which the transmission signal is converted; a receiving antenna 23 for receiving reflection waves, which are the electric waves generated by the reflection of the transmission wave from the transmitting antenna 22, reflected from the detection range and converting the reflection waves into a reception signal; and a mixer 24 for mixing the transmission signal outputted from the oscillator and the reception signal outputted from the receiving antenna 23 and outputting the thus-obtained mixture signal to the filter unit 3. The transceiver unit 2 as described above can be realized by a known technique, so a detailed illustration and description thereof will be omitted. Also, instead of separately providing the transmitting antenna 22 and the receiving antenna 23 as mentioned above, a single antenna may perform such transmission and reception by using, for example, a known circulator.

Here, when a frequency of the electric wave transmitted by the transceiver unit 2, the speed of light, and a relative velocity between a moving object and the transceiver unit 2 are respectively given as $f0$, $c$ and $v$ m/s, a doppler frequency corresponding to a moving object is obtained as $2 \times v \times f0/c$. For example, let's consider a case where the frequency of a transmission signal is 24 GHz and if a relative velocity between the moving object and the transceiver unit 2 is 2 m/s or lower, the moving object is determined as a human body. In such a case, an upper limit of the frequencies to be provided by the filter unit 3 is obtained as about 320 ($2 \times 2 \times 24 \times 10^9/(3 \times 10^8)$) Hz by substituting 2 m/s, $24 \times 10^9$ Hz, about $3 \times 10^8$ m/s for $v$, $f0$ and $c$ in the above equation. In the present embodiment, however, the upper limit of the frequencies provided by the filter unit 3 is set to be higher than the foregoing value, and the intensity in the doppler signal is provided at every 1 Hz from 1 Hz to 500 Hz in the output from the FFT unit 52, for example.

Hereinafter, an operation of the determining unit 53 as the features of the present embodiment will be described. The following operation is executed whenever a spectrum of a doppler signal is inputted from the FFT unit 52 to the determining unit 53.

Figure 3:
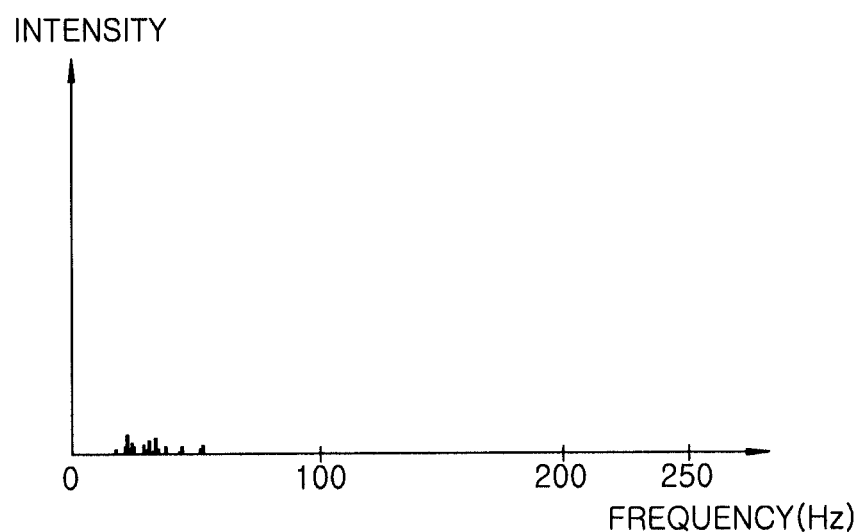
FIG. 3 is an explanatory view showing an example of a background spectrum in accordance with the present embodiment.

The determining unit 53 stores in advance a background spectrum therein, and subtracts the background spectrum from the spectrum of the doppler signal inputted from the FFT unit 52 to thereby obtain a difference spectrum, by which the determining unit 53 executes determination. Here, the background spectrum is, for example, a spectrum of the doppler signal in a state in which there exists no moving object in the detection range. An example of the background spectrum is shown in FIG. 3.

Further, the determining unit 53 stores in advance therein a reference spectrum, which is used in determining whether or not there is a moving object in the detection range. That is, with respect to each frequency included in the difference spectrum and the reference spectrum, the determining unit 53 compares the intensity of each frequency in the difference spectrum with the intensity of a corresponding frequency in the reference spectrum. Specifically, in comparing the intensities, when the intensities of, e.g., five frequencies in the difference spectrum are higher than those in the reference spectrum, the determining unit 53 determines that there is a moving object in the detection range.

On the other hand, when the number of frequencies whose intensities in the difference spectrum are higher than those in the reference spectrum is less than 5 in the comparison, the determining unit 53 determines that there is no moving object in the detection range. In other words, the determining unit 53 determines that there exists no human body in the detection range. In the present embodiment, five frequencies are used as a reference in determining the existence of a moving object, but the present invention is not limited thereto. For example, six or seven or more frequencies may be used as a reference.

In addition, when the determining unit 53 determines that there is a moving object in the detection range, it then determines whether or not the moving object is a human body through a spectrum analysis using a frequency having the highest intensity (hereinafter, referred to as 'first peak frequency') in the difference spectrum. Specifically, the determining unit 53 determines whether or not one of the first peak frequency and a frequency having the second highest intensity (hereinafter, referred to as a 'second peak frequency') is an integer multiple of the other. In other words, the determining unit 53 determines whether or not a value obtained by dividing the first peak frequency by the second peak frequency is N or 1/N. Here, N is an integer that is equal to or greater than 2.

When it is determined that one of the first peak frequency and the second peak frequency is an integer multiple of the other, the determining unit 53 determines that the moving object is not a human body and that there is no human body in the detection range. Accordingly, it is possible to avoid an erroneous detection caused by regarding as a human body a periodically operating moving object, such as an air blower, or an erroneous detection resulting from periodical electronic noises generated by an electric device such as a discharge lamp lighting device or the like.

Figure 1B:
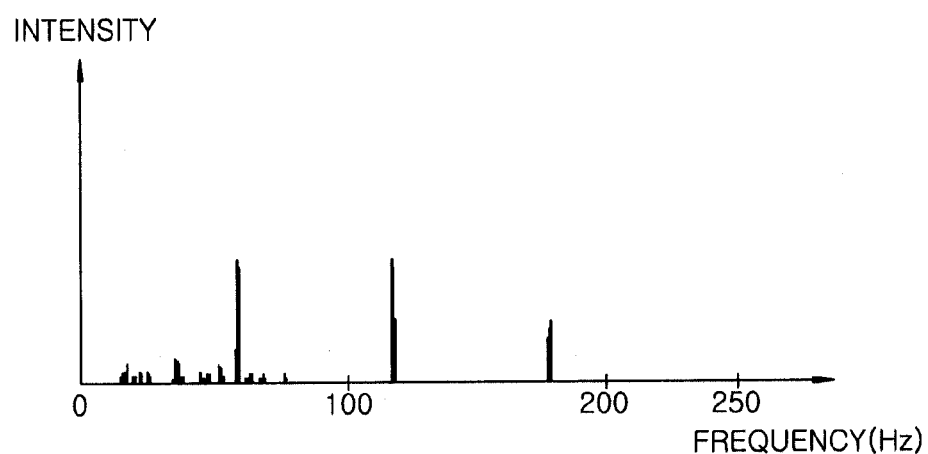
Figure 1C:
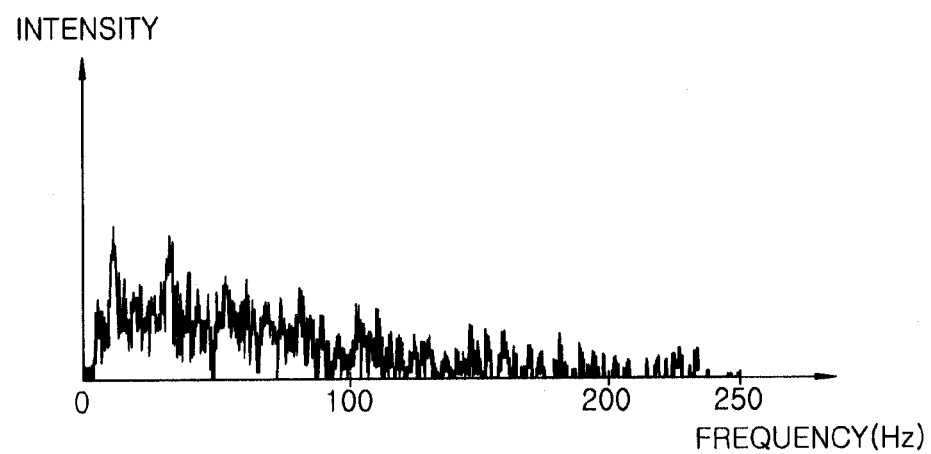

FIG. 1B shows an example of the difference spectrum used in determining that a moving object is not a human body based on the foregoing operation. In the example of FIG. 1B, the first peak frequency is 120 Hz, the second peak frequency is 60 Hz, and the first peak frequency is an integer multiple (double) of the second peak frequency.

Further, when one of the first peak frequency and the second peak frequency is not an integer multiple of the other, the determining unit 53 calculates a sum (or an integral) of the intensities of the frequencies in each of frequency bands of the same width in the low frequency side and the high frequency side with respect to the first peak frequency in the difference spectrum.

If it is assumed that the first peak frequency is fm and the width of the frequency band in which the summation (or integration) is executed is X, a summation (or integration) range of the low frequency side is fm−X to fm, and an integration range of the high frequency side is fm to fm+X. Preferably, the width X of the frequency band is as large as possible. For example, if the difference spectrum ranges from 1 Hz to 500 Hz and when the first peak frequency fm is lower than 250 Hz, the width X of the frequency band becomes equal to the first peak frequency fm, so that 1 Hz is included in the summation range of the low frequency side. On the other hand, when the first peak frequency fm is higher than 250 Hz, the width X of the frequency band becomes 500−fm obtained by subtracting the first peak frequency fm from 500 Hz, so that 500 Hz is included in the summation range of the high frequency side.

Then, when the value of the sum in the low frequency side of the first peak frequency is less than that in the high frequency side thereof, the determining unit 53 determines that the moving object is not a human body and that there is no human body in the detection range.

Here, when the moving object is a human body, the difference spectrum includes components of relatively high frequencies (e.g., 160 Hz) generated by movement of a whole part of the human body and components of relatively low frequencies from, e.g., several tens to one hundred and several tens of hertz generated by movement of hands or feet thereof.

As for the intensity, the component generated by the movement of the whole part of the human body become relatively high and, thus, the first peak frequency is included in the components of the relatively high frequencies. Accordingly, the value of the sum becomes higher in the low frequency side of the first peak frequency than in the high frequency side thereof.

As for, e.g., raindrops, however, the value of the sum tends to be lower in the low frequency side of the first peak frequency than in the high frequency side thereof. In other words, through the foregoing operation, it is possible to prevent raindrops from being erroneously detected as a human body. FIG. 10 shows an example of the difference spectrum used in determining that a moving object is not a human body by the foregoing operation. In the example of FIG. 10, the first peak frequency is about 10 Hz.

On the other hand, when the value of the sum is greater in the low frequency side than in the high frequency side, the determining unit 53 determines that the moving object is a human body and that there is a human body in the detection range. In brief, in the present embodiment, only when the conditions of the comparison between the difference spectrum and the reference spectrum, the comparison between the first peak frequency and the second peak frequency, and the comparison between the sums of the low frequency side and the high frequency side of the first peak frequency are all met, it is determined that there is a human body in the detection range, and when one or more of the conditions are not met, it is determined that there is no human body in the detection range. FIG. 1A shows an example of the difference spectrum used in determining that there is a human body in the detection range.

Further, when the determining unit 53 determines that there is a human body in the detection range, the determining unit 53 outputs a signal (hereinafter, referred to as 'detection signal') indicating that a human body has been detected. The detection signal is, for example, a voltage signal.

The detection signal is inputted to, e.g., the light source driving unit 7 for turning on an electrical light source 6 based on the determination result of the determining unit 53. As the light source 6, a known light source such as a light emitting diode (LED), a fluorescent lamp, or the like may be used. When an LED is used as the light source 6, a known DC power circuit may be used as the light source driving unit 7. When a fluorescent lamp is used as the light source 6, a known electronic ballast may be used as the light source driving unit 7.

Further, as for an operation of the light source driving unit 7, the following may be made. For example, the light source driving unit 7 turns on the light source 6 with a rated power until a certain control delay time lapses after it is determined by the determining unit 53 that a human body exists in the detection range (i.e., after a detection signal is inputted). Then, when a state in which it is determined by the determining unit 53 that there is no human body in the detection range (i.e., a state in which a detection signal is not inputted) continues for the control delay time, the light source driving unit 7 turns off the light source 6 or reduces a power outputted to the light source 6.

The doppler sensor 1 and the light source driving unit may be respectively provided in separate units that transmit and receive signals to and from each other, or may be provided in a single illumination device.

While the invention has been shown and described with respect to the embodiments, it will be understood by those skilled in the art that various changes and modifications may be made without departing from the scope of the invention as defined in the following claims.

What is claimed is:

1. An illumination device comprising:

doppler sensor and a light source driving unit, wherein the Doppler sensor comprises a doppler signal generation unit configured to transmit an electromagnetic wave to a detection range and receiving electromagnetic waves from a detection range, and generating a doppler signal based on a transmission signal used in transmitting the electromagnetic wave and a reception signal obtained from the received electromagnetic waves; and a determining unit configured to compare a difference spectrum with a reference spectrum to determine whether or not a moving object exists in the detection range and further configured to determine, when it is determined that there is a moving object in the detection range, whether or not there exists a human body in the detection range through a spectrum analysis using a first peak frequency, which is a frequency having the highest intensity in the difference spectrum obtained by subtracting a background spectrum from the spectrum of the doppler signal, wherein, in the spectrum analysis, the determining unit determines that there is no human body in the detection range when one of the first peak frequency and a second peak frequency having the second highest intensity in the difference spectrum is an integral multiple of the other, and wherein the light source driving unit is configured to turn on an electric light source based on a determination result from the determining unit.

2. The illumination device of claim 1, wherein, in the spectrum analysis, the determining unit calculates sums of intensities over frequency bands of a same width in a low frequency side and a high frequency side with respect to the first peak frequency, and determines that there is no human body in the detection range when a sum in the low frequency side is less than that in the high frequency side.

3. An illumination device comprising:

a doppler sensor and a light source driving unit, wherein the doppler sensor comprises a doppler signal generation unit configured to transmit an electromagnetic wave to a detection range and receiving electromagnetic waves from a detection range, and generating a doppler signal based on a transmission signal used in transmitting the electromagnetic wave and a reception signal obtained from the received electromagnetic waves; and a determining unit configured to compare a difference spectrum with a reference spectrum to determine whether or not a moving object exists in the detection range and further configured to determine, when it is determined that there is a moving object in the detection range, whether or not there exists a human body in the detection range through a spectrum analysis using a first peak frequency, which is a frequency having the highest intensity in the difference spectrum obtained by subtracting a background spectrum from the spectrum of the doppler signal, wherein the determining unit determines whether or not the moving object exists in the detection range based on the number of frequencies whose intensity in the difference spectrum is higher than that in the reference spectrum, and wherein the light source driving unit is configured to turn on an electric light source based on a determination result from the determining unit.

\* \* \* \* \*